United States Patent
Shen et al.

(10) Patent No.: US 8,046,612 B2
(45) Date of Patent: Oct. 25, 2011

(54) POWER CONTROL SYSTEM AND METHOD FOR CONTROLLING POWER ADAPTER TO INPUT POWER TO PORTABLE ELECTRONIC DEVICE

(75) Inventors: Yi-Hung Shen, Taipei (TW); Tsang-Ming Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 717 days.

(21) Appl. No.: 11/761,375

(22) Filed: Jun. 12, 2007

(65) Prior Publication Data
US 2008/0148082 A1    Jun. 19, 2008

(30) Foreign Application Priority Data
Dec. 13, 2006 (TW) .............................. 95146579 A

(51) Int. Cl.
*G06F 1/26* (2006.01)
(52) U.S. Cl. ........................................ 713/320
(58) Field of Classification Search .............. 713/320
See application file for complete search history.

(56) References Cited

U.S. PATENT DOCUMENTS

| | | | | |
|---|---|---|---|---|
| 5,442,512 A | * | 8/1995 | Bradbury ................. | 361/679.55 |
| 5,729,117 A | * | 3/1998 | Fukuda ..................... | 320/117 |
| 6,789,030 B1 | * | 9/2004 | Coyle et al. ............... | 702/77 |
| 7,501,794 B2 | * | 3/2009 | Felder et al. ............... | 320/128 |

FOREIGN PATENT DOCUMENTS

| | | | |
|---|---|---|---|
| CN | 2165564 | | 5/1994 |
| CN | 2165564 Y | * | 5/1994 |
| CN | 1614439 | | 5/2005 |
| CN | 1614439 A | * | 5/2005 |
| TW | 200411202 | | 7/2004 |

OTHER PUBLICATIONS

"1st Office Action of China counterpart application", issued on Jun. 19, 2009, p. 1-p. 6.
"Office Action of Taiwan counterpart application", issued on Nov. 27, 2009, p. 1-p. 6.

* cited by examiner

*Primary Examiner* — Mohammed H Rehman
(74) *Attorney, Agent, or Firm* — Jianq Chyun IP Office

(57) ABSTRACT

A system and a method for power control are provided. In the present invention, a control switch is disposed in a power adapter, which is turned on/off by a monitoring device disposed in a portable electronic device. As a result, the power inputted into the power adapter can be controlled, and thus the power consumption during the portable electronic being shut down is reduced. In addition, the present invention controls the power providing for a battery according to a detected power on/off signal and the electric quantity of the battery. The control switch is turned off to stop the power adapter from providing power when the electric quantity of the battery reaches a reference value. Therefore, the overheating situation of the portable electronic device or the battery that may shorten their service life because of continuing receiving power can be avoided.

11 Claims, 2 Drawing Sheets

POWER CONTROL SYSTEM AND METHOD FOR CONTROLLING POWER ADAPTER TO INPUT POWER TO PORTABLE ELECTRONIC DEVICE

CROSS-REFERENCE TO RELATED APPLICATION

This application claims the priority benefit of Taiwan application serial no. 95146579, filed on Dec. 13, 2006. All disclosure of the Taiwan application is incorporated herein by reference.

BACKGROUND OF THE INVENTION

1. Field of the Invention

The present invention relates to a system and a method for power control. More particularly, the present invention relates to a system and a method for power control by controlling a power to be switched on or off.

2. Description of Related Art

As the rapid development of science and technology, electronics have been increasingly prevailing. Portable electronics, such as notebook computers, personal digital assistants (PDAs) are the most favorite ones among the users, due to the features of being light, thin, short, and small and having multiple functions.

As for the portable electronic products, the power supply is an important part. In order to provide the portable electronic products with a battery having a long endurance and save the consumption of the battery, a rechargeable lithium battery is generally used as a source for the power supply in the conventional art. When the power of the lithium battery is not sufficient, it only needs to connect the electronic product to a transformer, which can charge the lithium battery.

However, the current transformers available on the market do not have the functions of automatically controlling the power on/off of the power thereof. That is to say, when the lithium battery has already been charged completely, the transformer will continuously supply the power. Even when the electronic product is powered off, the transformer still continuously runs, and thus the power is continuously consumed. As a result, the power is continuously consumed and the energy is wasted by the transformer, and thus leading to the overheating of the transformer and shortened service life of the transformer.

In order to solve the problems, the conventional art has proposed a set of solutions, that is, adding a manual switch in front of the transformer. When the user does not need the transformer to supply the power, he/she manually switches off the transformer, as described in ROC Patent Application No. M259392. However, the above method can only tackle the problem on the surface, not at the root. Each time when powering off the transformer, the user must manually turn off the switch of the transformer personally, which is not only considerably inconvenient for the user, but the situations that the user forgets to turn off the switch of the transformer also occurs, and thus the switch disposed for the transformer are almost non-existed.

In view of above, all the relevant manufactures of the portable electronic products are anxious to seek for proper solutions to overcome the above problems.

SUMMARY OF THE INVENTION

Accordingly, the present invention is directed to a power control system, applicable for controlling the turn-on/off of the power entering a power adapter according to power on/off status of the system and the status of the battery, so as to reduce the power consumption or avoid overheating of the power adapter.

The present invention is further directed to a power control method, applicable for controlling the turn-on/off of the power entering the power adapter according to the battery saturation status, so as to avoid the service life of the battery from being shortened because of continuing receiving power.

As embodied and broadly described herein, the present invention provides a power control system, which includes a power adapter and a monitoring device. The power adapter includes a first switch and a power circuit. The first switch is coupled to a power. The power circuit is coupled to the first switch for converting the voltage of the power, so as to be provided to a portable electronic device. The monitoring device is disposed in the portable electronic device and includes a latch and a controller. The latch is coupled to the first switch for latching the first switch. The controller is coupled to the latch for detecting the connection status and the electric quantity of the battery, so as to turn on/off the latch to latch the first switch, and thus controlling the input of the power.

In the power control system according to an embodiment of the present invention, the monitoring device further includes a second switch. The second switch is used to control the power on/off of the portable electronic device. When the second switch is turned on to power on the portable electronic device, the latch is enabled to turn on the first switch, such that the power circuit provides the power to the controller. If the controller detects the battery, it will further detect whether the electric quantity of the battery has reached a reference value or not. If the detected electric quantity of the battery has not reached the reference value yet, the latch is enabled to turn on the first switch, such that the power circuit provides the power for charging the battery; whereas if no battery is detected or the electric quantity of the battery has already reached the reference value, the latch is disabled to turn off the first switch, such that the power circuit is stopped from providing the power. When the portable electronic device is in an "OFF" state, if the battery is installed and connected, the latch is enabled to turn on the first switch, such that the power circuit provides the power to the controller. After receiving the power, the controller detects the electric quantity of the battery, so as to control the latch to latch the first switch, and to control the input of the power.

The present invention further provides a power control method, applicable for controlling a power adapter to input power to a portable electronic device. The power adapter includes a first switch and a power circuit, and the portable electronic device includes a controller and a latch. The method includes the following steps: a. the controller receives a power-off signal; b. the controller detects whether a battery is connected to the portable electronic device or not; c. if the battery is detected, the controller further detects whether the electric quantity of the battery has reached a reference value or not; d. if the electric quantity of the battery has not yet reached the reference value, the latch is enabled to turn on the first switch, such that the power circuit provides the power for charging the battery; and e. if the battery is not detected or the electric quantity of the battery has already reached the reference value, the latch is disabled to stop the power circuit from providing the power.

According to an embodiment of the present invention, after Step e, the power control method further includes continuously detecting whether the battery is connected or not. If the battery is installed and connected, it returns to Step c to continuously detect whether the electric quantity of the battery has reached the reference value or not, so as to turn on/off the first switch, and to control the power circuit to provide the power.

According to an embodiment of the present invention, in the power control method, when receiving the power-on signal, the controller enables the latch to turn on the first switch, such that the power circuit provides the power to the controller.

As the present invention adopts a power control system and method for controlling the power on/off of the power adapter by means of detecting the power on/off signal by a controller or according to the connection status and the electric quantity of the battery, the power consumption can be effectively reduced, and the overheating situation of the power adapter that may shorten the service life because of continuing receiving power can be avoided.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
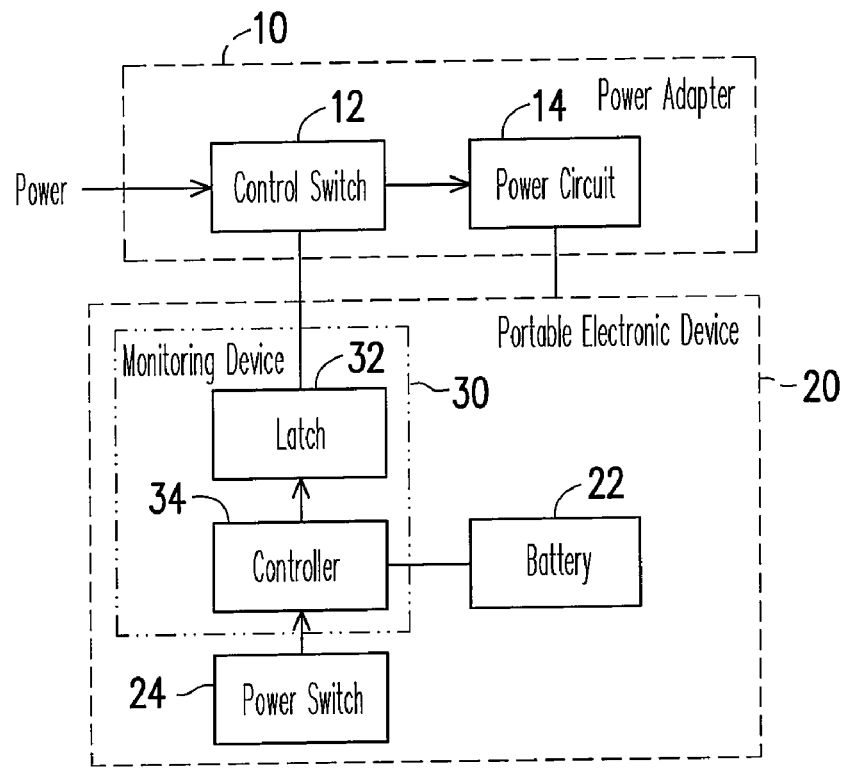
FIG. 1 is a block diagram of a power control system according to an embodiment of the present invention.

FIG. 1 is a block diagram of a power control system according to an embodiment of the present invention. Referring to FIG. 1, the structure of the system in the present embodiment can be divided into two parts, wherein one part is a power adapter 10, and the other part is a portable electronic device 20. The power adapter 10 generally refers to a power adapter having the functions of stepping up and stepping down the voltage, converting between alternating current (AC) and direct current (DC), and frequency converting, for example, (but not limited to) a transformer, a frequency converter, and an AC/DC converter. The power adapter 10 includes a control switch 12 and a power circuit 14. The control switch 12 is coupled to a power, which is used to control the ON/OFF state of the power according to an external instruction, so as to determine whether to provide an AC for the power circuit 14 to convert into a voltage required by the portable electronic device 20. For example, when the control switch 12 is turned off, the power circuit 14 does not have an input voltage, and thus, the power circuit 14 will not run. When the control switch 12 is turned on, the power circuit 14 receives an AC voltage and then converts the AC voltage into a DC voltage for being output to the portable electronic device 20. That is to say, the control switch 12 controls whether to run the power adapter 10 or not. When the control switch 12 is turned off, the power adapter 10 does not run; when the control switch 12 is turned on, the power adapter 10 converts the AC voltage into the DC voltage for being provided to the portable electronic device 20.

In this embodiment, the portable electronic device 20 is, for example, but not limited to, a notebook computer, and those of ordinary skills in the art can apply the present invention to other portable electronic devices such as PDAs and mobile phones depending upon the actual requirements. The portable electronic device 20 is disposed with a battery 22, a power switch 24, and a monitoring device 30. The battery 22 is a rechargeable battery that can be charged and discharged repeatedly such as a lithium battery or a nickel-hydrogen battery. When the portable electronic device 20 is connected to the power adapter 10, the power provided by the power adapter 10 can be used to charge the battery 22. The power switch 24 acts as a switch of the portable electronic device 20 for controlling the power on or off of the portable electronic device 20. When the power switch 24 is turned on, a power-on signal is output to the monitoring device 30; when the power switch 24 is turned off, a power-off signal is output to the monitoring device 30.

Figure 2:
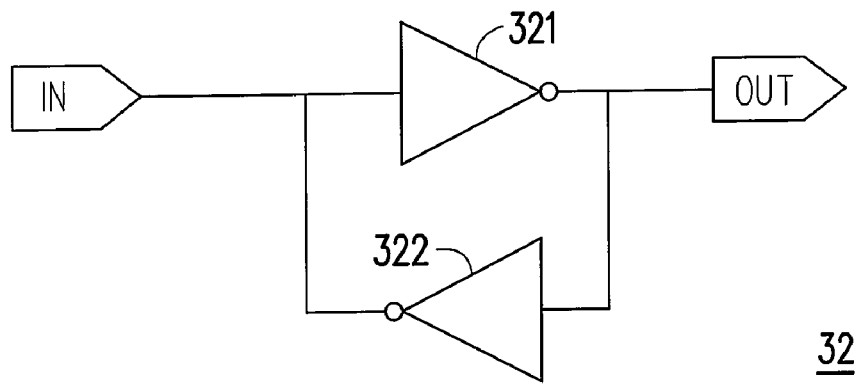
FIG. 2 is a circuit diagram of a latch according to an embodiment of the present invention.

It should be noted that, the monitoring device 30 includes a latch 32 and a controller 34. The latch 32 is used to adjust the ON/OFF state of the control switch 12. The latch 32 has two stable logic states "0" or "1" and stores the two logic states in the device till the value of bits needs to be changed or the power is removed, which is useful for avoiding the errors caused by the shift of the logic potential. FIG. 2 is a circuit diagram of a latch according to an embodiment of the present invention. Referring to FIG. 2, the latch 32 in this embodiment is illustrated by two NOT gates 321, 322. An input end IN of the latch 32 is coupled to the controller 34, an output end OUT of the latch 32 is coupled to the control switch 12. It is assumed that the control switch 12 is turned on upon receiving the logic potential 0, and it is turned off upon receiving the logic potential 1.

Table 1 is a relation table for the ON/OFF state of the control switch 12 corresponding to the logic states of the output/input end of the latch 32. Referring to Table 1, that is to say, if the input end IN of the latch 32 receives a logic 1, the control switch 12 is turned on, and the power adapter 10 provides the DC power to the portable electronic device 20; otherwise, if the input end IN of the latch 32 receives a logic 0, the control switch 12 is turned off, and the power adapter 10 is in a non-functional state. That is to say, the power adapter 10 dose not consume any power. Those of ordinary skills in the art can also implement the present invention with any other latch, for example, R-S flip-flop and D Flip-flop. Additionally, a buffer can be added on the output end of the latch 32, which will not be described herein.

TABLE 1

| Input End of Latch 32 | Output End of Latch 32 | Control Switch 12 |
|---|---|---|
| Logic 1 | Logic 0 | ON |
| Logic 0 | Logic 1 | OFF |

In view of the above, the controller 34 is respectively coupled to the battery 22, the power switch 24, and the latch 32 for detecting the connection status and the electric quantity of the battery 22, and for receiving the power-on/off signal sent from the power switch 24. According to the previous data, the controller 34 can suitably enable or disable the latch 32, so that the latch 32 can further send out signals to the control switch 12 for controlling the power circuit 14 to provide the power. The controller 34 is, for example, but not limited to, an embedded controller built in the portable electronic device 20. An embodiment is described below to further illustrate the circumstances of the power on/off state of the portable electronic device 20 and whether the battery 22 is installed or not.

Figure 3:
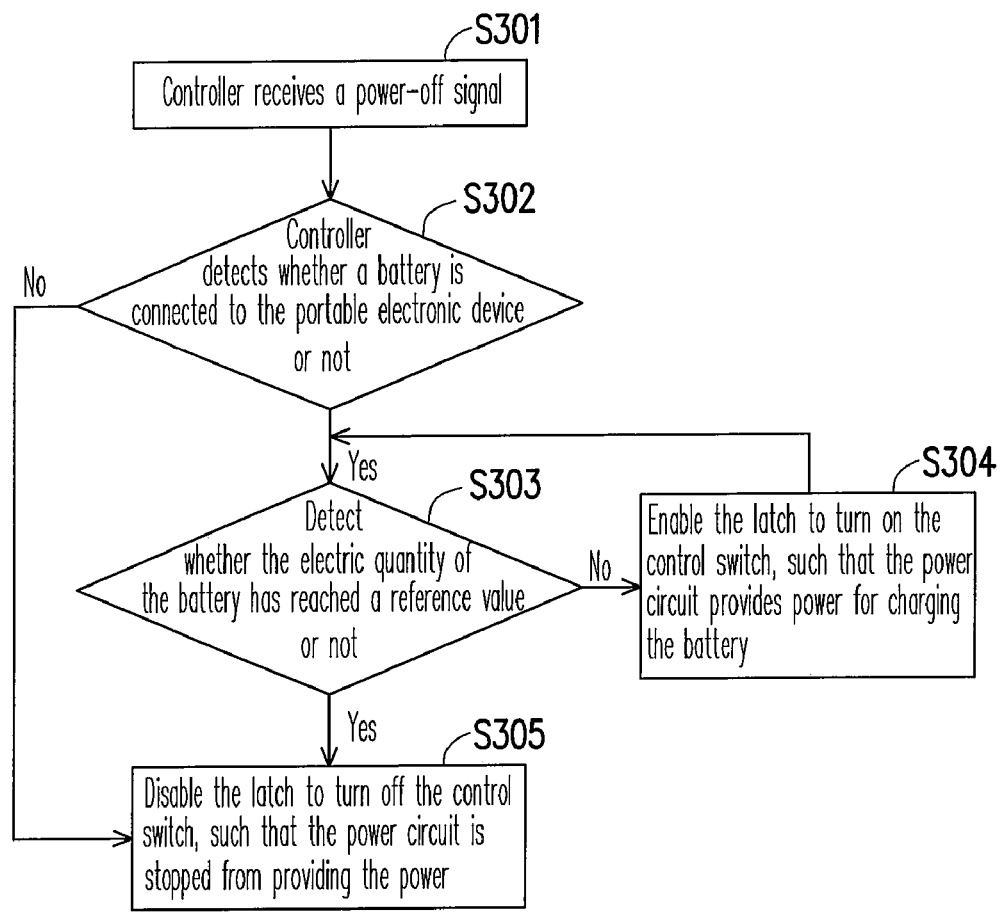
FIG. 3 is a flow chart illustrating a power control method under the circumstance of being powered off according to an embodiment of the present invention.

FIG. 3 is a flow chart illustrating a power control method under the circumstance of being powered off according to an embodiment of the present invention. Referring to FIG. 1 and FIG. 3, in this embodiment, it is assumed that the portable electronic device 20 is initially in an ON state, that is to say, the control switch 12 is in an ON state, such that the power adapter 10 converts an AC voltage into a DC voltage for being provided to the portable electronic device 20.

When the user powers off the portable electronic device 20 (for example, presses down the power switch 24 or selects to power off in the window), the controller 34 receives the power-off signal (Step S301). Next, it proceeds to Step S302, in which the controller 34 detects whether the battery 22 is connected to the portable electronic device 20 or not. If the portable electronic device 20 has installed with the battery 22, it turns to Step S303 to detect whether the electric quantity of the battery 22 has reached the reference value or not; otherwise, if the portable electronic device 20 is not installed with the battery 22, it jumps to Step S305, in which the controller 34 disables the latch 32 to turn off the control switch 12, such that the power circuit 14 provides the power to the portable electronic device 20.

According to the above description, when it is detected whether the electric quantity of battery 22 has reached the reference value or not in Step S303, if the electric quantity of the battery 22 for the portable electronic device 20 has reached a saturation state, the controller 34 disables the latch 32 to turn off the control switch 12, such that the power circuit 14 is stopped from providing the power to the portable electronic device 20 (Step S305); otherwise, if the electric quantity of the battery 22 has not yet reached the saturation state, the controller 34 enables the latch 32 to turn on the control switch 12, such that the power circuit 14 provides the power for charging the battery 22 (Step S304). In other words, the sprit of this embodiment lies in that, when the portable electronic device 20 is powered off, the controller 34 determines whether the battery 22 has been charged completely. If the battery 22 is charged completely, the power adapter 10 is powered off, thereby reducing the additional power consumption due to the continuous operation of the power adapter 10, and avoiding the overheating situation of the portable electronic device 20 or the battery 22 that may shorten their service life because of continuing receiving power.

In this embodiment, if the user installs the battery 22 into the portable electronic device 20 after powering off the portable electronic device 20, the latch 34 is enabled by the power of the battery 22, so as to turn on the control switch 12, such that the power circuit 14 provides the power to the portable electronic device 20. Next, it performs the above Steps S303-S305 to continuously detect whether the electric quantity of the battery 22 has reached the reference value or not, so as to turn on/off the control switch 12, and to control the control power circuit 14 to provide the power to the portable electronic device 20. In this way, even if the portable electronic device 20 is in an "OFF" state, other batteries 22 can still be charged, and when the batteries 22 are charged completely, the power adapter 10 is powered off to save the power consumption.

Figure 4:
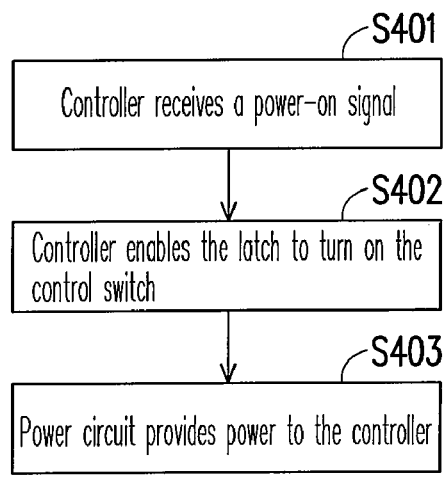
FIG. 4 is a flow chart illustrating a power control method under the circumstance of receiving a power-on signal according to an embodiment of the present invention.

Besides the above power off action, the present invention also includes automatically turning on the control switch 12 to provide the power to the portable electronic device 20 after receiving the power-on signal, and the detailed implementing steps are described as follows. FIG. 4 is a flow chart illustrating a power control method under the circumstance of receiving a power-on signal according to an embodiment of the present invention. Referring to FIG. 4, the process of powering on the portable electronic device 20 from an "OFF" state is described through this embodiment. When the user presses down the power switch 24, the power switch 24 sends out a power-on signal to the controller 34. After receiving the power-on signal (Step S401), the controller 34 enables the latch 32 to turn on (conduct) the control switch 12 (Step S402). At this time, the power adapter 10 is returned to a normal operation, and thereby providing the power to the controller 34 and the portable electronic device 20 (Step S403). In this way, when the portable electronic device 20 is powered on from an "OFF" state, the power adapter 10 is also be waken up and powered on, and thus, it is not necessary for the user to turn on the switch of the power adapter 10 manually, which is very convenient for the user.

In view of above, the power control system and method of the present invention at least has the following advantages.

1. The power on/off signal, the connection status and electric quantity of the battery are automatically detected to control the operation of the power adapter, and thus, it is not necessary for the user to turn on the switch of the power adapter manually, which is convenient for the user to operate.

2. The charging current is properly provided according to the electric quantity of the battery, and once the battery is charged fully, the power adapter is powered off, and thus, the power consumption of the power adapter is reduced, and the overheating situation of the portable electronic device or the battery that may shorten their service life because of continuing receiving power can be avoided.

3. The battery can be installed and charged when the portable electronic device is in an "OFF" state, and the power adapter can be properly powered off, and thus the power consumption is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power control system, comprising:
    a power adapter, comprising:
        a first switch, directly coupled to a power, for controlling the power according to a plurality of logic states; and
        a power circuit, coupled to the first switch, for converting a voltage of the power, so as to be provide the converted voltage to a portable electronic device; and
    a monitoring device, disposed in the portable electronic device, comprising:
        a latch, coupled to the first switch, for latching the first switch according to the logic states;
        a controller, coupled to the latch, for detecting a connection status and an electric quantity of a battery, generating the plurality of logic states, and transmitting the logic states to the latch, so as to turn on/off the latch for latching the first switch, and thus controlling an input of the power,
        wherein if the electric quantity of the battery has not yet reached a reference value, the controller turns on the latch for latching the first switch to provide the power to the power circuit, and if the battery is not detected or the electric quantity of the battery has already reached the reference value, the controller turns off the latch for latching the first switch to stop providing the power to the power circuit; and a second switch, for controlling power on/off of the portable electronic device, wherein when the second switch is turned on to power on the portable electronic device, the latch is enabled to turn on the first switch, such that the power circuit provides the power to the controller.

2. The power control system as claimed in claim 1, wherein if the battery is detected, the controller further detects whether the electric quantity of the battery has reached a reference value or not.

3. The power control system as claimed in claim 2, wherein if the electric quantity of the battery detected by the controller has not yet reached the reference value, the latch is enabled to turn on the first switch, such that the power circuit provides the power for charging the battery.

4. The power control system as claimed in claim 2, wherein if the controller does not detect the battery or the electric quantity of the battery reaches the reference value, the latch is disabled to turn off the first switch, such that the power circuit is stopped from providing the power.

5. The power control system as claimed in claim 1, wherein when the portable electronic device is in an "OFF" state, if the battery is installed and connected, the latch is enabled to turn on the first switch, such that the power circuit provides the power to the controller.

6. The power control system as claimed in claim 5, wherein after receiving the power, the controller detects the electric quantity of the battery, so as to control the latch to latch the first switch, and to control the input of the power.

7. The power control system as claimed in claim 1, wherein the portable electronic device comprises one of a notebook computer and a personal digital assistant (PDA).

8. The power control system as claimed in claim 1, wherein the controller is an embedded controller.

9. A power control method, applicable for controlling a power adapter to input a power to a portable electronic device, wherein the power adapter comprises a first switch directly coupled to a power for controlling the power according to a plurality of logic states and a power circuit, and the portable electronic device comprises a latch coupled to the first switch, for latching the first switch according to the plurality of logic states and a controller for generating the plurality of logic states, and transmitting the plurality of logic states to the latch, the method comprising:

a. receiving a power-off signal by the controller;

b. detecting whether a battery is connected to the portable electronic device or not by the controller;

c. if the battery is connected, further detecting whether an electric quantity of the battery has reached a reference value or not by the controller;

d. if the electric quantity of the battery has not yet reached the reference value, enabling the latch to turn on the first switch, such that the power is provided to the power circuit for charging the battery;

e. if the battery is not detected or the electric quantity of the battery has already reached the reference value, disabling the latch to turn off the first switch, so as to stop providing the power to the power circuit; and f. continuously detecting whether the battery is connected or not, if the battery is installed and connected, returning to Step c to continuously detect whether the electric quantity of the battery has reached the reference value or not, so as to turn on/off the first switch, and thus controlling the power circuit to provide the power.

10. The power control method as claimed in claim 9, further comprising:

receiving a power-on signal by the controller;

enabling the latch to turn on the first switch by the controller; and providing the power to the controller by the power circuit.

11. The power control method as claimed in claim 9, wherein the portable electronic device further comprises:

a second switch, for enabling the latch to turn on the first switch, such that the power circuit provides the power to the controller.

* * * * *